US012560221B2

(12) United States Patent
Cattoor et al.

(10) Patent No.: US 12,560,221 B2
(45) Date of Patent: Feb. 24, 2026

(54) SYMMETRIC 4 SPEED TRANSMISSION WITH COUNTERSHAFT POWER-SHIFT GEARBOX AND INPUT REDUCTION GEAR SET

(71) Applicant: Dana Belgium N.V., Flanders (BE)

(72) Inventors: Kurt Cattoor, Koolkerke (BE); Filip Van Raepenbusch, Bruges (BE); Filip D. Schacht, Meulebeke (BE)

(73) Assignee: DANA BELGIUM, Bruges (BE)

( * ) Notice: Subject to any disclaimer, the term of this patent is extended or adjusted under 35 U.S.C. 154(b) by 0 days.

(21) Appl. No.: 17/933,006

(22) Filed: Sep. 16, 2022

(65) Prior Publication Data

US 2024/0093762 A1　　Mar. 21, 2024

(51) Int. Cl.
　　*F16H 3/093*　　　(2006.01)
　　*B60K 1/00*　　　(2006.01)
　　　　　(Continued)

(52) U.S. Cl.
　　CPC .............. *F16H 3/093* (2013.01); *B60K 1/00* (2013.01); *B60K 1/02* (2013.01); *F16H 57/0436* (2013.01);
　　　　　(Continued)

(58) Field of Classification Search
　　CPC .......... F16H 3/006; F16H 3/091; F16H 3/093; F16H 57/0436; F16H 2003/0826;
　　　　　(Continued)

(56) References Cited

U.S. PATENT DOCUMENTS 3,654,819 A * 4/1972 Link ...................... B23Q 5/142
　　　　　　　　　　　　　　　74/360
6,138,528 A * 10/2000 Fukumoto ............... F16H 61/16
　　　　　　　　　　　　　　　74/745

(Continued)

FOREIGN PATENT DOCUMENTS

CN　　112477571 A * 3/2021
EP　　2243983 A2　10/2010
GB　　2110324 A　　6/1983

OTHER PUBLICATIONS

CN 112477571 A (Lei Shi) Mar. 12, 2021 (full text). [online] [retrieved on Sep. 7, 2023]. Retrieved from: Clarivate Analytics. (Year: 2021).*

(Continued)

*Primary Examiner* — Joseph Brown
(74) *Attorney, Agent, or Firm* — McCoy Russell LLP

(57) ABSTRACT

Methods and systems for a multi-ratio gear box and a countershaft power-shift transmission are provided. The system contains one or more electric motors coupled to a transmission housing in such that the electric motor does not exceed the highest point of the transmission. A first shaft may be coupled to one or more input speed reduction gear sets. A second shaft may be coupled to a multi-range clutch allowing two speeds. A third shaft may be coupled to a low-speed clutch and a fourth shaft may be coupled to a high-speed clutch, together doubling the number of speeds. The high and low speed clutches provide a large gear spread that allow the twin range clutches to have a reduced gear spread, overall reducing the required size of the transmission system.

18 Claims, 9 Drawing Sheets

(51) Int. Cl.
B60K 1/02 (2006.01)
F16H 57/04 (2010.01)
F16H 3/08 (2006.01)

(52) U.S. Cl.
CPC ............... *F16H 2003/0826* (2013.01); *F16H 2200/0021* (2013.01); *F16H 2200/0043* (2013.01); *F16H 2200/0095* (2013.01)

(58) Field of Classification Search
CPC ... F16H 2057/02039; F16H 2200/0021; F16H 2200/0043; F16H 2200/0085; B60K 1/02; B60K 7/0007; B60K 17/06; B60K 1/00
See application file for complete search history.

(56) References Cited

U.S. PATENT DOCUMENTS

| | | | | |
|---|---|---|---|---|
| 6,984,187 | B2 | 1/2006 | Biermann | |
| 10,808,804 | B2 * | 10/2020 | Byltiauw | F16H 3/093 |
| 11,750,063 | B2 * | 9/2023 | Umerley | H02K 11/33 |
| | | | | 180/65.1 |
| 2006/0213321 | A1 * | 9/2006 | Regenscheit | F16H 3/093 |
| | | | | 74/730.1 |
| 2017/0219083 | A1 * | 8/2017 | Ito | F16H 57/0423 |
| 2019/0063557 | A1 * | 2/2019 | Cattoor | F16H 3/093 |
| 2022/0396137 | A1 * | 12/2022 | Glöckner | B60K 17/02 |

OTHER PUBLICATIONS

Transmission Auxiliary Fluid Pump diagram Chevrolet Cruze. (Jan. 15, 2016). 7zap. Retrieved Apr. 1, 2025, from https://chevrolet.7zap. com/en/cruze/53427-2017/0-0-1883805542/0-1884925878-0-0%7C-2017+2017+bgbhbj68+automatic+transmission+mnu6t35+auxiliar y+fluid+pump/#376 (Year: 2016).*
Stafford, M. (Feb. 26, 2019). Hydraulics Fundamentals Part II: Accumulators & Shift Feel. Sonnax. Retrieved Apr. 1, 2025, from https://www.sonnax.com/tech_resources/675-hydraulics-fundamentals-part-ii-accumulators-shift-feel (Year: 2019).*
"Automatic PowerShift transmission," John Deere Website, Available Online at https://salesmanual.deere.com/sales/salesmanual/en_ NA/tractors/2012/feature/transmissions/8r_8rt/automatic_powershift. html#:~text=The%20PowerShift%20transmission%20uses% 20a,maximum%20fuel%20economy%20and%20productivity, Available as Early as Mar. 2, 2014, 5 pages.

* cited by examiner

Shift strategy

| Gear/clutch | L | H | 1 | 2 |
|---|---|---|---|---|
| 1 | x |   | x |   |
| 2 | x |   |   | x |
| 3 |   | x | x |   |
| 4 |   | x |   | x |

FIG. 2B

Gear/clutch ratio 1

Gear/clutch ratio 2

Gear/clutch ratio 3

SYMMETRIC 4 SPEED TRANSMISSION WITH COUNTERSHAFT POWER-SHIFT GEARBOX AND INPUT REDUCTION GEAR SET

FIELD

The present disclosure relates generally to mechanical transmission devices in which multiple gear ratios and output shaft directions of rotation are selectively obtainable.

BACKGROUND AND SUMMARY

Vehicles may include a transmission for a controlling power generated by the engine. The transmission may include one or more shafts and gears which may engage or disengage with one another based on a selected gear ratio.

Multi-speed power-shift transmissions of the countershaft type may include a pair of friction clutches and associated gears operatively assembled on a speed clutch shaft. The speed clutch shaft is supported adjacent to its ends by bearings carried in end walls of a transmission housing. Power input to the speed clutch shaft, in transmissions having an equal number of forward and reverse speed ratios, is provided by forward and reverse clutches assembled on an input shaft that is also supported by bearings in the housing end walls. A gear on the forward clutch adjacent to one housing end wall drives a gear on the speed clutch shaft and a gear on the reverse clutch adjacent to the opposite housing end wall drives through a reverse idler gear to another gear on the speed clutch shaft. The reverse idler gear is carried on its own countershaft. The speed clutch shaft can therefore be driven in either a forward or reverse direction by alternately engaging the forward and reverse clutches. The pair of forward and reverse ratio clutches each has a drive gear that meshes, in ratio-determining relationship, with a respective driven gear on a power output shaft. Since the pitch diameters of the speed ratio gears are chosen differently for the two speed clutches, two output shaft speeds are selectively available.

The inventors have recognized various issues with such an approach. For example, if more than two speed ratios are demanded, such as four speeds in each direction, additional speed clutch shafts along with additional bearings, gears and the necessary fluid pressure transfer systems can be provided. The additional number of components such as gears, shafts and bearings as well as an increased complexity and size of the housing in providing additional bearing bores and pressure fluid manifolds and passages can lead to an overly large transmission housing size, as well as increased weight relative to less complex transmission systems, just to name some of the issues.

In one embodiment, the approaches disclosed herein provide a system for a multi-ratio gearbox, comprising a first shaft coupled to one or more input speed reduction gear sets, a second shaft coupled to a multi-range clutch, a third shaft coupled to a low-speed clutch, and a fourth shaft coupled to a high-speed clutch. In an example, the shafts, gears, and clutches described herein allow for four speed ratios with a relatively large spread between the high-speed clutch and low-speed clutch while maintaining reduced gear spread between the multi-range clutches. This reduced gear spread between the multi-range clutches may provide more equal (and relatively smaller) gear sizes and lower gear/shaft speeds.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF DRAWINGS

FIG. 2B shows a shift strategy for the 4 speed transmission system.

DETAILED DESCRIPTION

Figure 1:
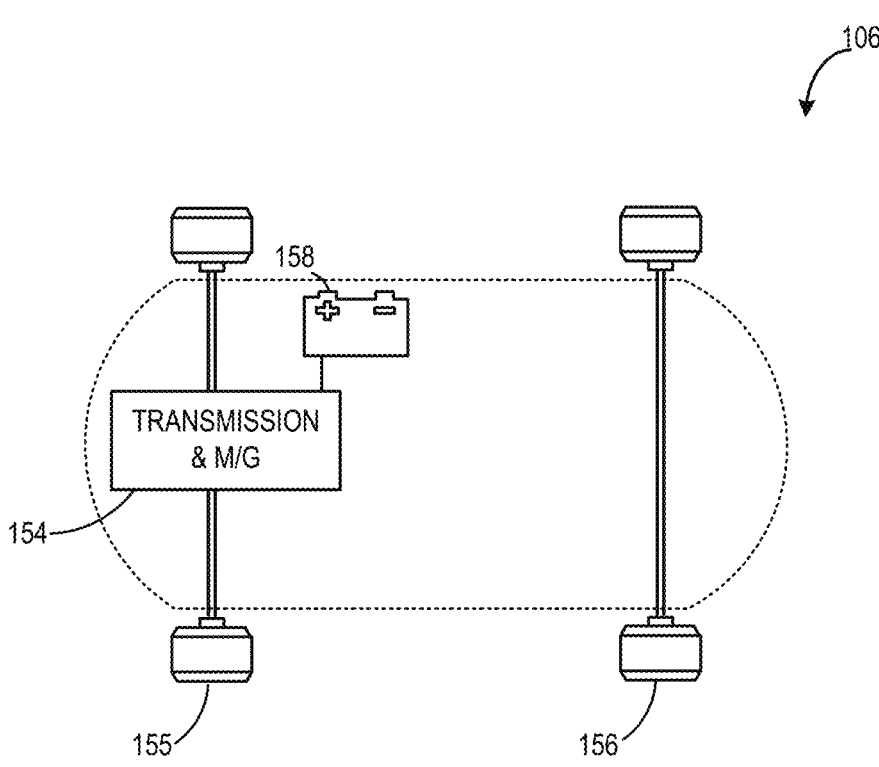
FIG. 1 shows a schematic of a car with a transmission, an electric motor, a battery, rear wheels, and front wheels. There is a control system including a controller with sensors and actuators.
Figure 1:
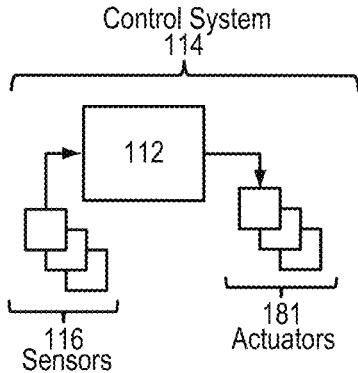

A transmission system with two or more selectable gears is described herein. In one embodiment, the transmission system may be a four speed transmission including a multi-ratio gearbox. Further, the transmission system may be a countershaft power-shift transmission. A compact layout of clutches in the system allows the system to achieve greater gear ratio selection without unduly impacting the system's space efficiency than may be provided by less compact layouts. In addition to a multi-range clutch, additional clutches are designed to modify the system's power path to add additional available speeds.

In one embodiment, the systems disclosed herein provide a transmission housing comprising a symmetric four speed schematic with an equal number of forward and reverse driving gears. A first shaft may be coupled to one or more input speed reduction gear sets. A second shaft may be coupled to a multi-range clutch. A third shaft may be coupled to a low-speed clutch. A fourth shaft may be coupled to a high-speed clutch. The transmission system may include three sections, the first being input reduction gear set(s), the second being the multi-range clutch (which will hereafter be referred to as the first range clutch and the second range clutch), and the third being the low-speed and high-speed clutch. This may provide a high/low range shift at the transmission output which reduces a needed gear spread in the second section of the gearbox. The reduced gear spread may result in more equal gear sizes and lower gear/shaft speeds. Small gear sizes are evidently beneficial for the overall required installation space.

In one embodiment, the multi-range clutch (e.g., clutches discussed further below with respect to FIG. 2) may be friction clutches and a high-speed and a low-speed clutches may be friction clutches. In such embodiments that the multi-range clutch are friction clutches, the clutches that comprise the multi-range clutches may be friction clutches. For example, the multi-range clutch may include two or more range clutch positions that each include one or more friction clutches.

FIGS. 1-4 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

Turning now to FIG. 1, a schematic depiction of a vehicle system 106 that can derive propulsion power from an electric motor 154 (e.g., a drive motor) is shown. In one embodiment, electric motor 154 may be a traction motor. Electric motor 154 may receive electrical power from a traction battery 158 to provide torque to rear vehicle wheels 155. Electric motor 154 may also be operated as a generator to provide electrical power to charge traction battery 158, for example, during a braking operation. It should be appreciated that while FIG. 1 depicts electric motor 154 mounted in a rear wheel drive configuration, other configurations are possible, such as employing electric motor 154 in a front wheel configuration, or in a configuration in which vehicle system 106 includes two electric motors, including an electric motor mounted to both the rear vehicle wheels 155 and front vehicle wheels 156.

Electric motor 154 may include a gearbox integrated therein (to be described further herein). Additionally or alternatively, the electric motor 154 may be coupled to an outside of a transmission/gearbox housing. The integrated gearbox may include one or more input speed reduction gear sets. Electric motor 154 may also include at least one clutch. Additionally or alternatively, vehicle system 106 may include multiple traction batteries configured to provide power to different driven wheels, wherein power to the wheels may be predicated based on traction at the wheels, driver demand, and other conditions. In one example, the vehicle system 106 may include a symmetric four speed schematic wherein there are an equal number of forward and reverse drive speeds.

Controller 112 may form a portion of a control system 114. Control system 114 may receive information from a plurality of sensors 116 and send control signals to a plurality of actuators 181. As one example, the plurality of sensors 116 may include sensors such as a battery level sensor, clutch activation sensor, etc. As another example, the plurality of actuators 116 may include a clutch, among others. Controller 112 may send a signal to an actuator of the clutch(es) to engage or disengage the clutch(es), so as to couple or decouple power transmission from the electric motor 154 to the rear vehicle wheels 155 or the front vehicle wheels 156. The controller 112 may receive input data from the pluality of sensors 116, process the input data, and trigger the plurality of actuators 181 in response to the processed input data based on instruction or code programmed therein corresponding to one or more routines, and stored on a non-transitory memory.

Figure 2A:
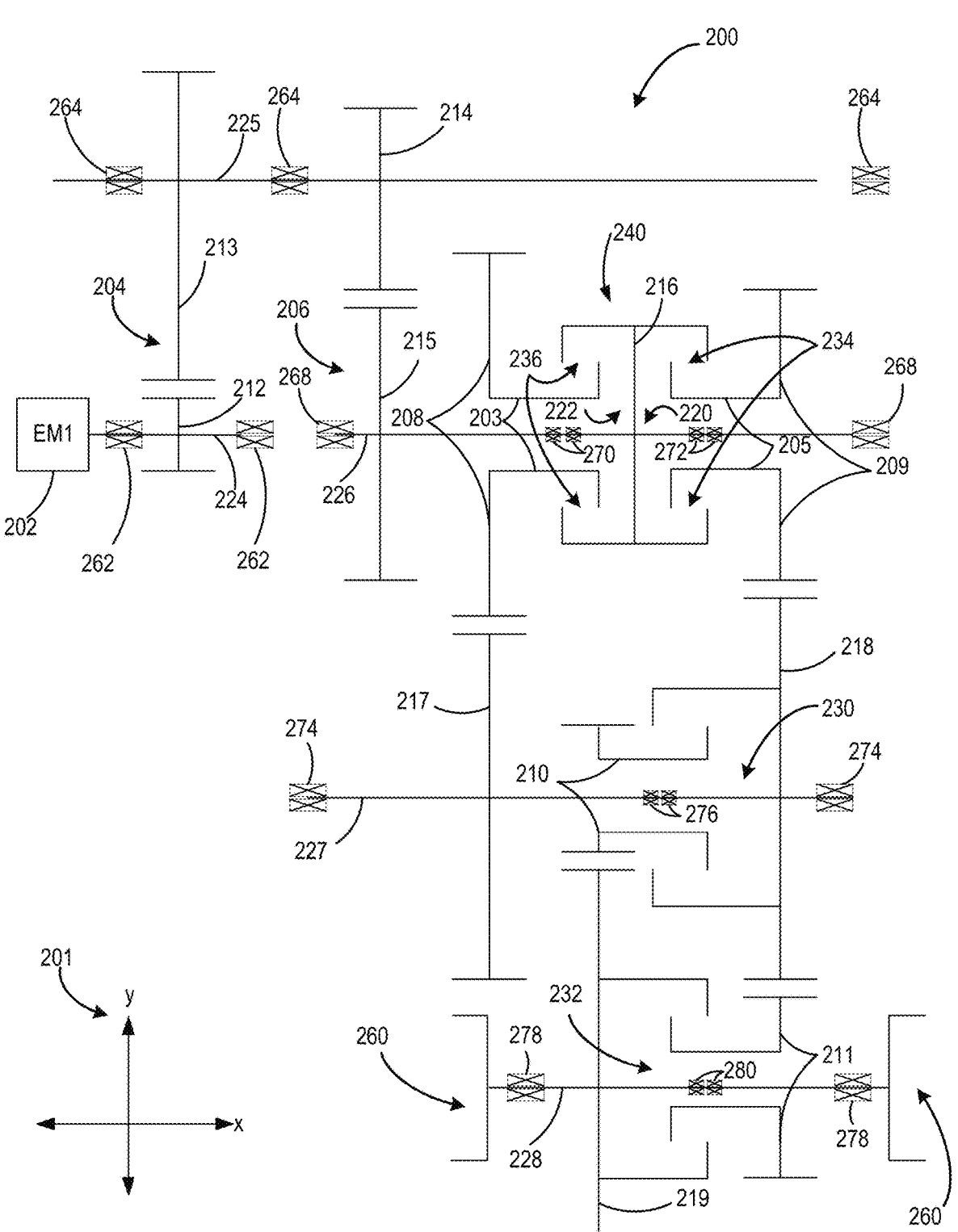
FIG. 2A shows a schematic of a 4 speed transmission system comprising a gearbox with three sections, including a multi-range range clutch, a high-speed clutch, and a low-speed clutch, connected to a single electric motor.

Turning now to FIG. 2A, a line diagram of an exemplary transmission system 200 is shown. A shift strategy for a multi-ratio gear box of the transmission system 200 is depicted in FIG. 2B. Transmission system 200 may include a total of four gear/clutch ratios corresponding to four selectable speeds. A first speed is gear/clutch ratio 1 which may include a multi-range clutch 240 in a first range clutch position 220 and a low-speed clutch 230 engaged. This configuration will herein be referred to as a first configuration of the transmission system 200. A second speed is gear/clutch ratio 2, which may include the multi-range clutch 240 is in a second range clutch position 222 and the low-speed clutch 230 engaged. This configuration will herein be referred to as a second configuration of the transmission system 200. A third speed is gear/clutch ratio 3, which may include the multi-range clutch 240 in the first range clutch position 220 and a high-speed clutch 232 engaged. This configuration will herein be referred to as a third configuration of the transmission system 200. A fourth speed is gear/clutch ratio 4, which may include the multi-range clutch 240 in the second range clutch position 222 and the high-speed clutch 232 engaged. This configuration will herein be referred to as a fourth configuration of the system.

All of the shafts herein described extend in a direction parallel to the x-axis and all of the gears herein described extend in a direction parallel to the y-axis of axis 201. The y axis of axis 201 may correspond with gravity. In some examples, a shaft 224, a shaft 225, and output shafts 226, 227, and 228 may extend through the relevant gears or clutches to which they are coupled. In one embodiment, the shaft 225 (e.g., first shaft) first shaft (e.g. shaft 225) may be vertically above output shaft 226 (e.g., second shaft), the output shaft 226 (e.g., second shaft) may be vertically above output shaft 227 (e.g., third shaft), and the output shaft 227 (e.g., third shaft) may be vertically above the output shaft 228 (e.g., fourth shaft) (e.g., output shaft 228) when arranged in a vehicle.

In one example, first shaft 225 and second shaft 226 may be parallel to each other, the first shaft 225 and third shaft 227 may be parallel to each other, the first shaft 225 and the fourth shaft 228 may be parallel to each other, the second shaft 226 and third shaft 227 may be parallel to each other, the second shaft 226 and fourth shaft 228 may be parallel to each other, and the first shaft 225, second shaft 226, third shaft 227, and fourth shaft 228 may all be parallel to each other. The fourth shaft 228 may be positioned lower with respect to gravity than the first, second, and third shafts 225, 226, and 227, repsectively.

All of the clutches herein described (e.g., the multi-range clutch 240 the low-speed clutch 230, and the high-speed clutch 232) may be oriented vertically where the vertical top of each clutch is above a shaft and the vertical bottom of each clutch is below that same shaft. For example, the low-speed clutch 230 is oriented such that the vertical top of the clutch is above shaft 227 and the vertical bottom of the clutch is below shaft 227 with respect to the y axis/gravity when installed in a vehicle positioned on the ground.

Electric motor 202 (e.g., electric motor 154 from FIG. 1) may be coupled to the input side of shaft 224. In one embodiment, electric motor 202 may be an electric traction motor. The shaft 224 receives power from the electric motor 202 and the shaft 224 in turn transfers power to downstream components. Specifically, shaft 224 may be coupled to a first gear 212, which in turn may be coupled to a second ear 213. Bearings 262, located at either end of shaft 224, may support and facilitate rotation of the shaft 224. Second gear 213 may then be coupled to input side of shaft 225. The first input speed reduction gear set 204 includes a first set of gears and a first set of shafts. The first set of gears includes first gear 212 and a second gear 213. The set of shafts includes shaft 224 and shaft 225. The first input speed reduction gear set 204 comprises the first half of the first section of the gearbox.

The output side of shaft 225 may be further coupled to gear 214. Bearings 264, located at either end of shaft 225 and between second gear 213 and gear 214 in the axis of shaft 225, may support and facilitate rotation of the output shaft 225. Gear 214 may then be coupled to gear 215 which may be coupled to output shaft 226. This second set of gears and shafts makes up the second input speed reduction gear set 206, which may comprise the second half of the first section of the gearbox. In one embodiment, shaft 225 may be the first shaft of the multi-ratio gear box referred to above.

Output shaft 225 may extend through both second gear 213 and gear 214. Second gearears 213 and gear 214 may be parallel to each other running parallel to the y-axis and in the same horizontal axis as each other.

The electric motor 202 may run at relatively higher speeds compared to a combustion engine and the speeds may need to be reduced before going into the transmission system 200. Due to] high transmission torques and loads, bearings of a relatively larger size may be required but these larger bearings may not be able to accept the high speeds that would be produced if the input speed reduction gear set 204 and the input speed reduction gear set 206 were not present.

One embodiment of the transmission system 200 including an input reduction gear set is described. A drive input shaft (e.g. shaft 224) rotates at an input speed. When two shift elements of the reduction gear set are engaged (for example, closed in accordance with the shift logic of the gearbox) the output shaft (e.g. shaft 225) of the reduction gear set rotates at an output speed. The output speed may be lower than the input speed.

A second section of the gearbox may comprise the second shaft (e.g., output shaft 226) and the multi range clutch. This multi-range clutch 240 may allow for two different speeds. In one embodiment, the multi-range clutch 240 may include a first position coupling the second shaft (e.g., output shaft 226) to the third shaft (e.g., output shaft 227) via a low gear and a second position coupling the second shaft (e.g., output shaft 226) to the third shaft (e.g., output shaft 227) via a high gear.

In one embodiment, output shaft 226 may be coupled to gear 216, which may be coupled to the multi-range clutch 240. Bearings 268 may support and facilitate rotation of the output shaft 226. Bearings 268 may be located at either end of output shaft 226. Bearings 270 and 272 may further support and facilitate rotation of the output shaft 226. Bearings 270 and 272 may be located at either side of gear 216, as shown in FIG. 2A. The multi-range clutch 240 may be comprised of a set of parallel shafts including two clutches (e.g, clutch 234 and clutch 236) and two gears (e.g., gear 209 and gear 208). In one example, parallel shafts such as shaft 205 and shaft 203, clutches such as clutch 234 and 236, and gears such as gear 209 and gear 208 may make up the first range clutch position 220 and second range clutch position 222, respectively. Shaft 205 may couple to gear 216 via clutch 234 during conditions in which the first range clutch is engaged. Shaft 203 may couple to gear 216 via clutch 236 during conditions in which the second range clutch is engaged. Output shaft 226 may be coupled to gear 216, as seen in FIG. 2A. First range clutch position 220 may be engaged when gear 216 is shifted to the left by an actuator (not pictured in FIG. 2A). The second range clutch 222 may be engaged when gear 216 is shifted to the right by an actuator (not pictured in FIG. 2A).

In one example, gear 209 may be a low gear insofar that when in the first range clutch position 220, the second shaft (e.g., output shaft 226) is connected to the third shaft (e.g., output shaft 227) via gear 209 and the first range clutch position 220 produces a relatively lower speed than the speed produced when in the second range clutch position 222. Further, gear 208 may be a high gear insofar that when in the second range clutch position 222, the second shaft (e.g., output shaft 226) is connected to the third shaft (e.g., output shaft 227) via gear 208 and the second range clutch position 222 produces a relatively higher speed than the speed produced when in the first range clutch position 220.

FIG. 2A depicts the multi-range clutch 240 in a middle disconnected position. The first range clutch plate 234, during conditions in which the first range clutch position 220 is engaged, may couple to shaft 205 which is coupled to gear 209. The second range clutch plate 236, during conditions in which the second range clutch position 222 is engaged, may couple to shaft 203 which is coupled to gear 208. In one example, the middle disconnected position may not be used, but in other examples, the middle disconnected position may correspond to an idling position of the transmission.

The third section of the gearbox may comprise the low and high-speed clutches which may double the number of speeds of the transmission system 200, in one embodiment totaling four speeds. Gear 217 may be coupled to output shaft 227 and output shaft 227 may also be coupled to gear 218. Bearings 274 may support and facilitate rotation of the output shaft 227. Bearings 274 may be located at either end of the output shaft 227, see FIG. 2A. Bearings 276 may further support and facilitate rotation of the output shaft 227. Bearings 276 may be located along output shaft 227 in the vertical axis of the low-speed clutch 230, as shown in FIG. 2A. Gear 218 and gear 217 may be parallel to each other lying on opposite ends of output shaft 227 wherein gear 217 is towards the left with respect to the x-axis and gear 218 is towards the right with respect to the x-axis. Output shaft 227 may extend past the edges of both gear 217 and gear 218. The low-speed clutch 230 may be coupled to gear 218 above and below output shaft 227. The low-speed clutch 230 may be coupled to gear 219 via gear 210 during conditions in which the low-speed clutch 230 is engaged. Gear 218 may also be coupled to the high-speed clutch 232 via gear 211 during conditions in which the high-speed clutch 232 is engaged.

The various shafts (e.g., shaft 225, output shaft 226, output shaft 227, and output shaft 228) being positioned in parallel (e.g., in a parallel architecture) with one another may provide a desired form factor of the transmission housing. Further, the parallel architecture may enable bearing locations to be more supported throughout the transmission.

High-speed clutch 232 may be coupled to gear 219 above and below output shaft 228. Output shaft 228 may be coupled to the outputs 260 (e.g., to shafts that are coupled to the rear vehicle wheels 155 or the front vehicle wheels 156). Bearings 278 may support and facilitate the rotation of the output shaft 228. Bearings 278 may be located at either end of output shaft 228 prior to the coupling of the outputs 260 to the output shaft 228, as shown in FIG. 2A. Bearings 280 may further support and facilitate rotation of output shaft 228. Bearings 280 may be located along output shaft 228 in the y-axis of the high-speed clutch 232, as shown in FIG. 2A. Gear 219 may be parallel to gear 218 and gear 217, though its midpoint may be in a lower x-axis compared to the midpoints of gear 217 and gear 218. Output shaft 228 may be parallel to output shafts 227, 226, 225, and input shaft 224, and output shaft 228 may be the lowest in the transmission system 200 with respect to the y-axis as denoted in FIG. 2A.

During conditions of the first configuration of the transmission system 200 in which the first range clutch position 220 is engaged and the low-speed clutch 230 is engaged, gear 216 may be coupled to gear 218 via first range clutch plate 234, shaft 205, and gear 209. The low-speed clutch 230 may be coupled to gear 218 and may also be coupled to gear 219 via gear 210. Gear 219 may be coupled to output shaft 228 which may be coupled to the outputs 260.

Figure 5:
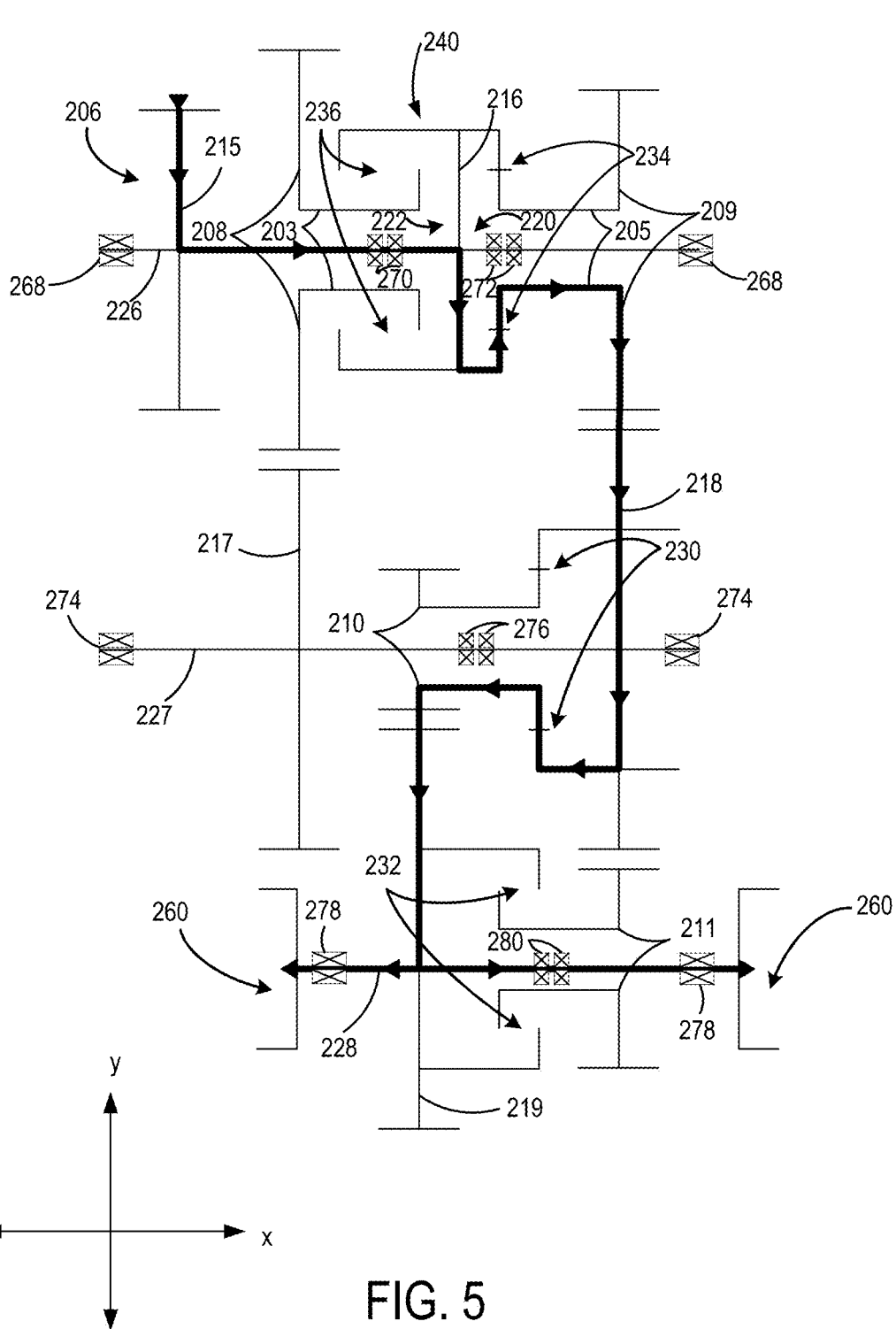
FIG. 5 shows a schematic of the 4 speed transmission in a first gear/clutch ratio with a power path depicted.

Turning now to FIG. 5, a power path of the configuration of the clutches in the first configuration of the transmission system 200 is shown. In this configuration, the power path travels through gear 215 to output shaft 226 and into gear 216. It then travels through the multi-range clutch 240 in first range clutch position 220 via gear 209 and travels to gear 218. From gear 218, the power path travels into the low-speed clutch 230 and then via gear 210, the power path travels from the low-speed clutch 230 into gear 219. The power path then travels from gear 219 into output shaft 228 and then into the outputs 260.

During conditions of the second configuration of the transmission system 200 in which the second range clutch position 222 is engaged and the low-speed clutch 230 is engaged, gear 216 may be coupled to gear 217 via second range clutch plate 236, shaft 203, and gear 208. Gear 217 may be coupled to output shaft 227 which may be coupled to gear 218. Gear 218 may be coupled to the low-speed clutch 230 via gear 210. The low-speed clutch 230 may then be coupled to gear 219 which may be coupled to output shaft 228. Output shaft 228 maybe coupled to the outputs 260.

Figure 6:
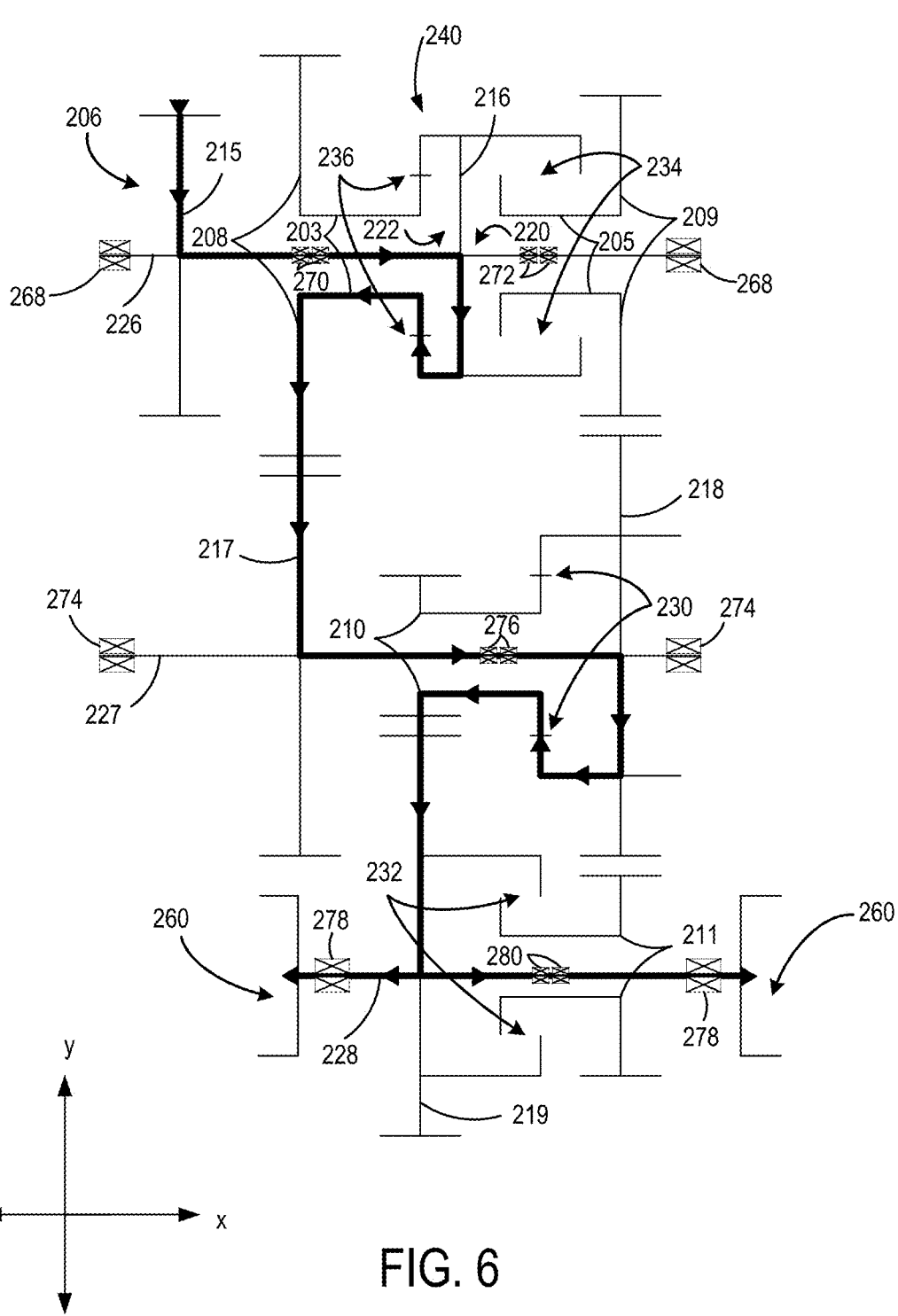
FIG. 6 shows a schematic of the 4 speed transmission in a second gear/clutch ratio with a power path depicted.

Turning now to FIG. 6, a power path of the configuration of the clutches in the second configuration of the transmission system 200 is shown. In this configuration, the power path travels through gear 215 to output shaft 226 and into gear 216. It then travels through the multi-range clutch 240 in the second range clutch position 222 and via gear 208 travels to gear 217. From gear 217, the power path travels into output shaft 227 and from output shaft 227, the power path travels into gear 218. From gear 218, the power path travels to the low-speed clutch 230 and then via gear 210, the power path travels from the low-speed clutch 230 into gear 219. The power path then travels from gear 219 into output shaft 228 and then into the outputs 260.

During conditions of the third configuration of the transmission system 200 in which the first range clutch position 220 is engaged and the high-speed clutch 232 is engaged, gear 216 may be coupled to gear 218 via first range clutch plate 234, shaft 205, and gear 209. Gear 218 may be coupled to the high-speed clutch 232 via gear 211. The high-speed clutch 232 may also be coupled to output shaft 228 which may be coupled to the outputs 260.

Figure 7:
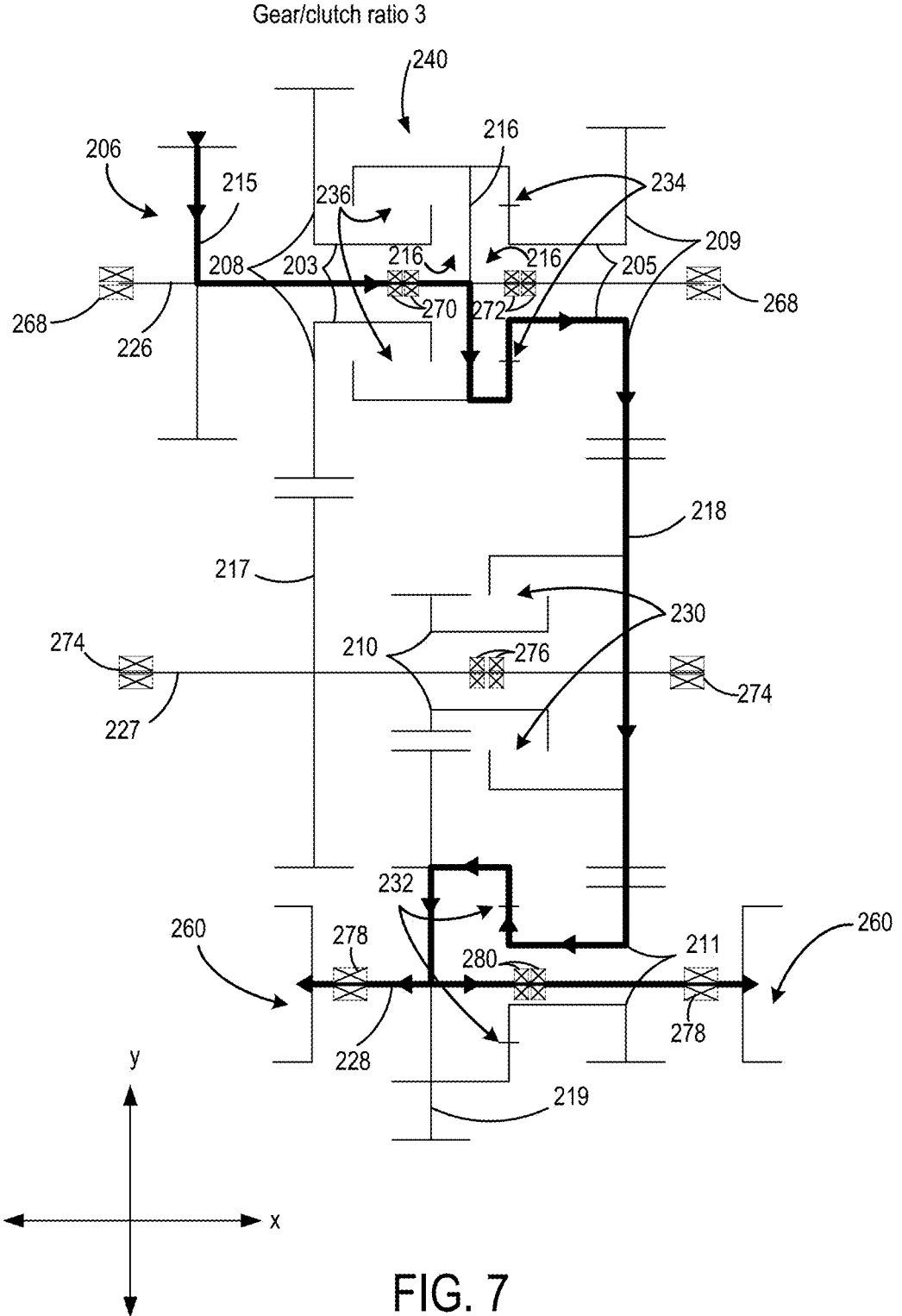
FIG. 7 shows a schematic of the 4 speed transmission in a third gear/clutch ratio with a power path depicted.

Turning now to FIG. 7, a power path of the configuration of the clutches in the third configuration of the transmission system 200 is shown. In this configuration, the power path travels through gear 215 to output shaft 226 and into gear 216. It then travels through the multi-range clutch 240 in the first range clutch position 220 and via gear 209 travels to gear 218. From gear 218, the power path travels to the high-speed clutch 232 via gear 211. Then the power path travels from the high-speed clutch 232 into gear 219. The power path then travels from gear 219 into output shaft 228 and then into the outputs 260.

During conditions of the fourth configuration of the transmission system 200 in which the second range clutch position 222 is engaged and the high-speed clutch 232 is engaged, gear 216 may be coupled to gear 217 via clutch plate 236, shaft 203, and gear 208. Gear 217 may be coupled to output shaft 227, which may be coupled to gear 218. Gear 218 may be coupled to the high-speed clutch 232 via gear 211. High-speed clutch 232 may be coupled to gear 219 which in turn may be coupled to output shaft 228. Output shaft 228 may be coupled to the outputs 260.

Figure 8:
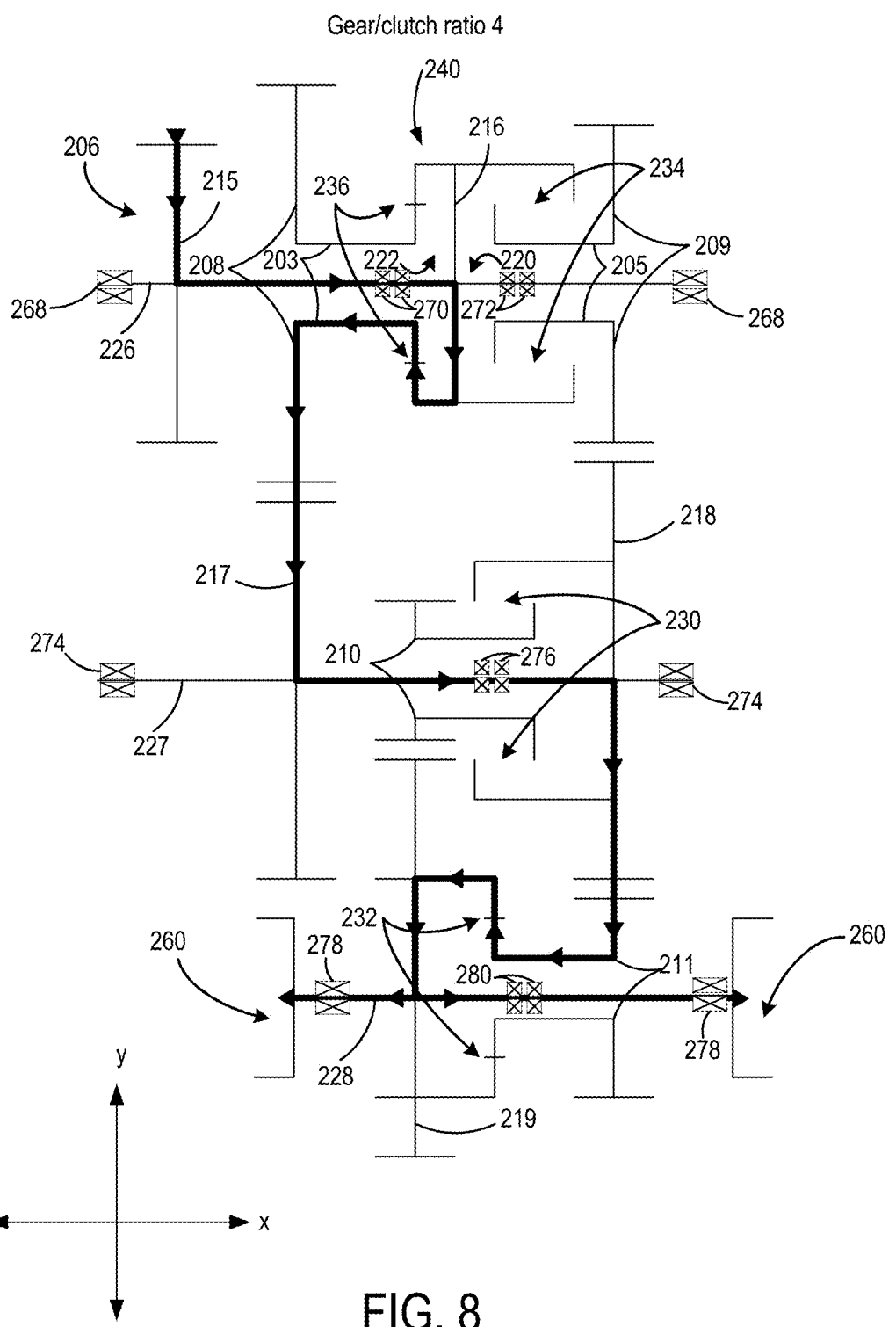
FIG. 8 shows a schematic of the 4 speed transmission in a fourth gear/clutch ratio with a power path depicted.

Turning now to FIG. 8, a power path of the configuration of the clutches in the fourth configuration of the transmission system 200. In this configuration, the power path travels through gear 215 to output shaft 226 and into gear 216. It then travels through the multi-range clutch 240 in the second range clutch position 222 and via gear 208 travels to gear 217. From gear 217, the power path travels into output shaft 227 and from output shaft 227, the power path travels into gear 218. From gear 218, the power path travels to the high-speed clutch 232 via gear 211. Then the power path travels from the high-speed clutch 232 into gear 219. The power path then travels from gear 219 into output shaft 228 and then into the outputs 260.

As described previously, the low-speed clutch 230 and the high-speed clutch 232 double the number of total speeds of the transmission system 200. In one embodiment, there may be two initial speeds from the multi-range clutch 240 (e.g., first range clutch position 220 and second range clutch position 222). The sequence of clutches and gears aforedescribed allow for reduced spread of the range clutches while doubling the number of speeds available. Advantageously, this four speed layout is relatively small and may be able to be used in specific applications that require a small envelope for the transmission. Further, when oriented in a vehicle, the architecture may enable a top of the motor(s) driving the transmission to be below a top of the transmission housing to better fit a desired vehicle envelope.

As stated previously, there may be a controller 112 with instructions stored therein to operate the multi-ratio gearbox with the motor turning in a first forward direction with each of four gear ratios including with: (1) the multi-range clutch 240 in the first position (e.g., first range clutch position 220), the low-speed clutch 230 engaged, and the high-speed clutch 232 disengaged, (2) the multi-range clutch 240 in a second position (e.g., second range clutch position 222), the low-speed clutch 230 engaged, and the high-speed clutch 232 disengaged, (3) the multi-range clutch 240 in the first position (e.g., the first range clutch position 220), the low-speed clutch 230 disengaged, and the high-speed clutch 232 engaged, and (4) the multi-range clutch 240 in the second position (e.g., the second range clutch position 222), the low-speed clutch 230 disengaged, and the high-speed clutch 232 engaged. The controller 112 may also have instructions to further operate the multi-ratio gearbox with the motor turning in a second reverse direction with each of the four gear ratios, wherein the multi-ratio gearbox does not reverse rotation via any of the multi-range clutch, the low-speed clutch, and the high-speed clutch.

The shift strategy depicted in FIG. 2A demonstrates the four available configurations of the multi-ratio gearbox. In these configurations, there may be two clutches engaged for each ratio. The neutral positions of the first range clutch 220, second range clutch 222, low-speed clutch 230, and high-speed clutch 232 that are depicted in the stick diagram of FIGS. 2 and 3 may not be used in operation in any of these ratios.

In one embodiment, the transmission system 200 may embody an overlap shifting method. In one example, when upshifting from gear/clutch ratio 1 (the first configuration of the system as described above) to gear/clutch ratio 2 (the second configuration of the system described above), the pressure on the first range clutch position 220 may decrease at the same time as the pressure on the second range clutch position 222 increases. In another example, when upshifting from gear/clutch ratio 2 (the second configuration of the system) to gear/clutch ratio 3, the pressure on the second range clutch position 222 may decrease at the same time as the pressure on the first range clutch position 220 increases and the pressure on the low-speed clutch 230 may decrease at the same time as the pressure on the high-speed clutch 232 may increase. In yet another example, when downshifting from gear/shift ratio 4 (the fourth configuration of the system as described above) to gear/shift ratio 3, the pressure on the second range clutch position 222 may decrease as the pressure on the first range clutch 220 increases. This same method of overlap shifting may apply to other combinations of downshifting or upshifting from one gear/clutch ratio to another gear/clutch ratio.

The layout of the third section (the low and high-speed clutches) of the multi-ratio gearbox herein described is such that the clutches at the transmission output zone create a relatively big spread. Therefore, there is a reduced gear spread between the first range clutch and the second range clutch. This reduced gear spread may result in more equal and smaller gear sizes than would be used with a larger gear spread. In turn, this may produce lower gear/shaft speeds which may avoid the presence of too high of shaft and clutch speeds. Too high of shaft and clutch speeds may become an issue with regard to the size of the bearings needed. As noted above, relatively larger bearings, as would be required in one embodiment of the present disclosure due to high power loads, do not allow high speeds. The reduced output speeds via the input speed reduction gear sets allows for the relatively larger bearings. There may be a further reduction in output speed when the low-speed clutch 230 is engaged, which may also reduce the load levels circulating through the gearbox. Lower load on the components therein may allow for smaller sized components for a similar high power level. Smaller sized components is evidently beneficial as they require a relatively smaller envelope for the transmission.

Figure 3:
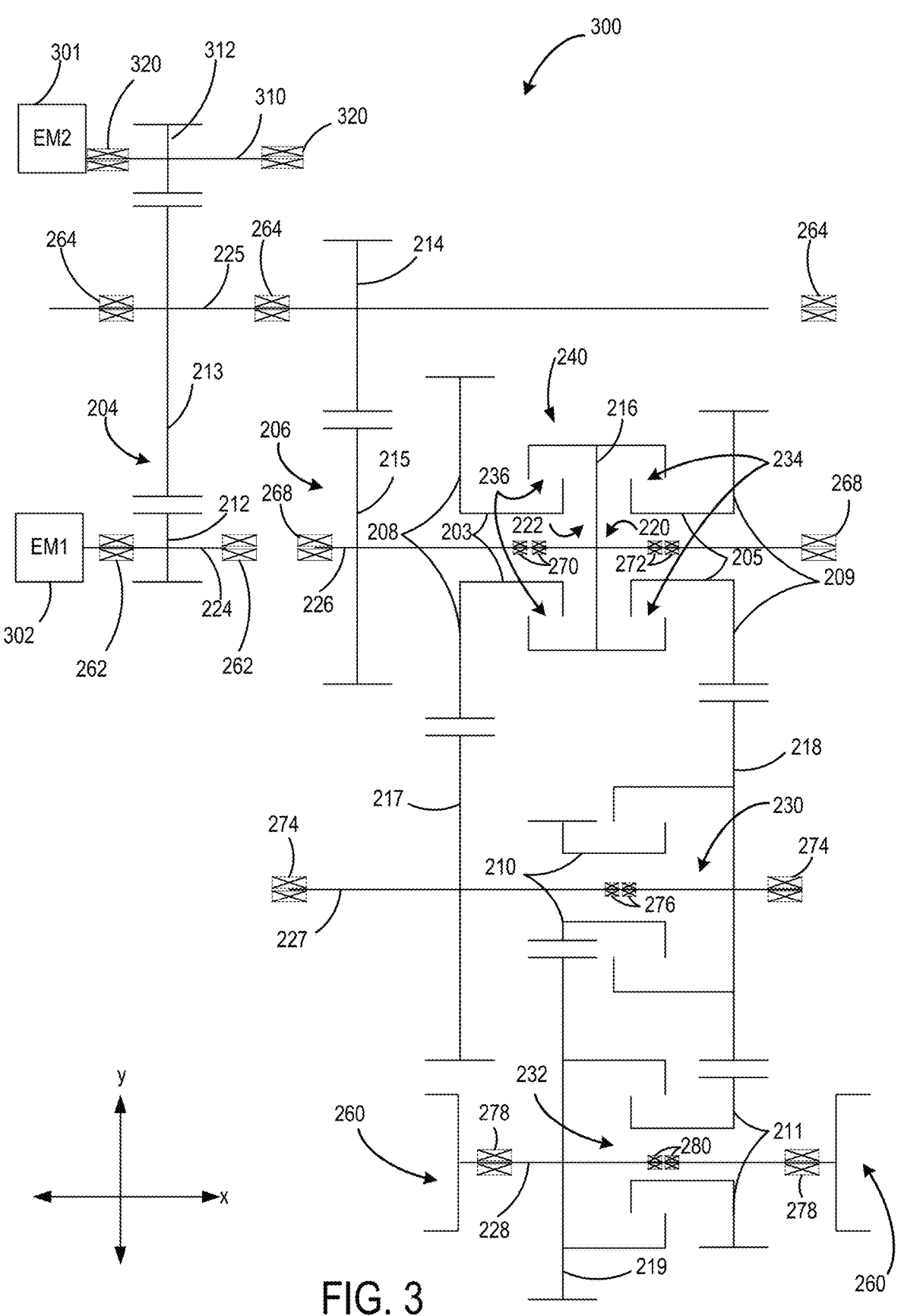
FIG. 3 shows a schematic of the 4 speed transmission system comprising a gearbox with three sections, including two range clutches and a high and a low clutch, connected to two electric motors.

FIG. 3 shows another embodiment of a transmission system 300 including two electric motors. All of the shafts, gears, and clutches that are present in FIG. 2A may be present in the same relative positions in FIG. 3 as they are in FIG. 2A and as such are labeled the same for consistency. The two electric motors of the transmission system 300 are electric motor 302, positioned in the same location as electric motor 202 was in FIG. 2A, and another electric motor 301. In one embodiment, electric motor 302 may be another electric traction motor. A first electric motor (e.g., electric motor 302) and A second electric motor (e.g., electric motor 301) may be coupled to the input side of the first shaft (e.g., shaft 225) via different gear ratios. Electric motor 301 may be positioned above electric motor 302 and above output shaft 225. Electric motor 301 may be coupled to input shaft 310. Bearings 320 may support and facilitate rotation of input shaft 310. Input shaft 310 may be coupled to gear 312. Gear 312 may be coupled to second gear 213. Input shaft 310 may be parallel to input shaft 224 and in the same vertical axis as input shaft 224. Gear 312 may be in the same vertical axis as first gear 212 in such that they are coupled to opposite ends of second gear 213. Having the option for two motors may allow for providing a higher power without having to increase the size of a single motor. It may also be easier to package two relatively smaller motors than a single relatively larger motor. Additionally, the option for a second motor may allow for the second motor to act as a backup if the first motor overheats. Additionally, having two different input ratios may provide for high speed/low torque and low speed/high torque options.

Figure 4:
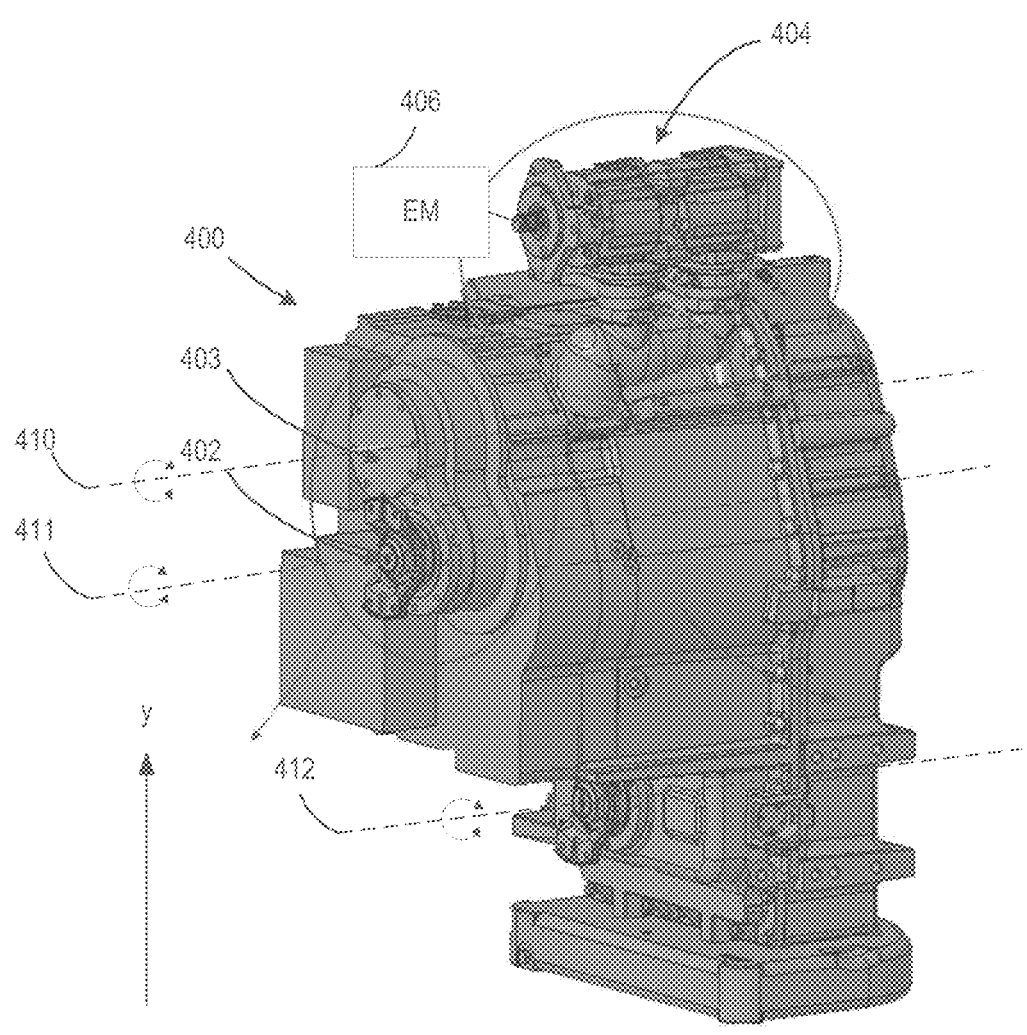
FIG. 4 shows an illustration of a box to house the transmission system.

Turning now to FIG. 4, an embodiment of a transmission housing 400 is depicted. The transmission system 200 may be housed inside the transmission housing 400. In one embodiment, the electric motor 202 may be housed inside a motor housing (not pictured). The transmission system 200, electric motor 202, and the control system 114 are not visible from this view of the transmission housing 400. There may be an offset box 402 that may allow the drive motor (e.g., electric motor 202) to be inputted into the transmission system 200. The relative positioning of the electric motor 202 and the transmission system 200 may be such that the electric motor 202 and its motor housing (not pictured) are installed to the transmission system 200 in a position not exceeding the highest point of the transmission system 200 and the transmission housing 400. Having the electric motor 202 arranged below the highest point of the transmission may allow for one or more input speed reduction gear sets. These input speed reduction gear sets reduce the torque loads throughout the gear box and allow for the larger sized bearings, as previously described. Having the electric motor 202 arranged below the highest point of the transmission 200 may also reduce the overall required size of the transmission housing. The transmission housing 400 may also contain a gear set to match the maximum electric motor 202 speed to the maximum transmission system 200 input speed.

Additionally, FIG. 4 depicts another input that may provide the option of coupling a second electric motor 301 to the transmission housing via offset box 403. Horizontal axis 410, horizontal axis 411, and horizontal axis 412 are depicted in FIG. 4 as well. Horizontal axis 410 may correspond to the horizontal axis of the shaft that electric motor 301 may couple to (e.g., shaft 310). Horizontal axis 411 may correspond to the horizontal axis of the shaft that electric motor 302 (or electric 202, in an example with only one electric traction motor) couples to (e.g., shaft 224). Horizontal axis 412 may correspond to the horizontal axis of the fourth shaft of the multi-ratio gear box (e.g., output shaft 228). Horizontal axis 410 may be parallel to horizontal axis 411. Horizontal axis 411 may be parallel to horizontal axis 412. Horizontal axis 410 may be parallel to horizontal axis 412.

Also additionally, FIG. 4 depicts a charging pump 404 that may be coupled directly to the vertical top of transmission housing 400, in such that the charging pump 404 and the transmission housing 400 are in face sharing contact. In one embodiment, the charging pump 404 may be driven by an electric motor 406. In one embodiment, electric motor 406 may be an electric pump motor, as opposed to an electric traction motor. The charging pump 404 may be detachable. As an option, the charging pump 404 may be detached from the transmission system 200 insofar that the charging pump 404 and the electric motor 406 that drives the charging pump 404 are in a remote location and connected to the transmission housing 400 via input and output hoses (not pictured). An option to be able to keep the charging pump 404 directly on the transmission housing 400 further reduces the size of the system which may decrease the needed size of the envelope for the transmission, and/or may allow for more precise control of transmission hydraulic pressures, which in turn can increase shift control.

While various embodiments have been described above, it should be understood that they have been presented by way of example, and not limitation. It will be apparent to persons skilled in the relevant arts that the disclosed subject matter may be embodied in other specific forms without departing from the spirit of the subject matter. The embodiments described above are therefore to be considered in all respects as illustrative, not restrictive.

Note that the example control and estimation routines included herein can be used with various powertrain and/or vehicle system configurations. The control methods and routines disclosed herein may be stored as executable instructions in non-transitory memory and may be carried out by the control system including the controller in combination with the various sensors, actuators, and other vehicle hardware. Further, portions of the methods may be physical actions taken in the real world to change a state of a device. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the vehicle control system, where the described actions are carried out by executing the instructions in a system including the various hardware components in combination with the electronic controller. One or more of the method steps described herein may be omitted if desired.

In another representation, the multi-ratio gearbox may comprise three shafts, including one or more of a first shaft coupled to one or more input speed reduction gear sets; a second shaft coupled to a multi-range clutch; a third shaft coupled to a low-speed clutch; and a fourth shaft coupled to a high-speed clutch.

The disclosure also provides support for a system for the multi-ratio gearbox, comprising: a first shaft coupled to one or more input speed reduction gear sets, a second shaft coupled to a multi-range clutch, a third shaft coupled to a low-speed clutch, and a fourth shaft coupled to a high-speed clutch. In a first example of the system, the first and second shafts are parallel. In a second example of the system, optionally including the first example, the first and third shafts are parallel. In a third example of the system, optionally including one or both of the first and second examples, the first and fourth shafts are parallel. In a fourth example of the system, optionally including one or more or each of the first through third examples, the second and third shafts are parallel. In a fifth example of the system, optionally including one or more or each of the first through fourth examples, the second and fourth shafts are parallel. In a sixth example of the system, optionally including one or more or each of the first through fifth examples second, third, and fourth shafts are parallel. In a seventh example of the system, optionally including one or more or each of the first through sixth examples, the multi-range clutch includes a first position coupling the second shaft to the third shaft via a low gear, and a second position coupling the second shaft to the third shaft via a high gear. In a eighth example of the system, optionally including one or more or each of the first through seventh examples, the fourth shaft is positioned lower with respect to gravity than the first, second, and third shafts. In a ninth example of the system, optionally including one or more or each of the first through eighth examples, the system further comprises: an electric motor coupled to an input side of the first shaft, and a controller with instructions stored therein to operate the multi-ratio gearbox with the motor turning in a first forward direction with each of four gear ratios including with: (1) the multi-range clutch in a first position, the low-speed clutch engaged, and the high-speed clutch disengaged, (2) the multi-range clutch in a second position, the low-speed clutch engaged, and the high-speed clutch disengaged, (3) the multi-range clutch in the first position, the low-speed clutch disengaged, and the high-speed clutch engaged, and (4) the multi-range clutch in the second position, the low-speed clutch disengaged, and the high-speed clutch engaged, and the instructions further operate the multi-ratio gearbox with the motor turning in a second reverse direction with each of the four gear ratios, wherein the multi-ratio gearbox does not reverse rotation via any of the multi-range clutch, the low-speed clutch, and the high-speed clutch. In a tenth example of the system, optionally including one or more or each of the first through ninth examples, the system further comprises: a charging pump coupled directly to a housing of the multi-ratio gearbox. In a eleventh example of the system, optionally including one or more or each of the first through tenth examples, the system further comprises: a pump motor coupled to the charging pump, the drive motor coupled directly to the housing. In a twelfth example of the system, optionally including one or more or each of the first through eleventh examples, the system further comprises: a first electric motor and a second electric motor coupled to an input side of the first shaft. In a thirteenth example of the system, optionally including one or more or each of the first through twelfth examples, the first electric motor and the second electric motor are coupled to the input side of the first shaft via different gear ratios.

The disclosure also provides support for a system, comprising: a countershaft power-shift transmission having an input, the transmission housed in a transmission housing, and an electric traction motor coupled to the input, the electric traction motor housed in a motor housing, wherein a vertical top of the motor housing is below a top of the transmission housing. In a first example of the system, the countershaft power-shift transmission is a four speed transmission including a first shaft coupled to one or more input speed reduction gear sets, a second shaft coupled to a multi-range clutch, a third shaft coupled to a low-speed clutch, and a fourth shaft coupled to a high-speed clutch. In a second example of the system, optionally including the first example, the system further comprises: a charging pump coupled to the vertical top of the transmission housing, wherein the multi-range clutch, the low-speed clutch, and the high-speed clutch are each friction clutches. In a third example of the system, optionally including one or both of the first and second examples, the system further comprises: another electric traction motor coupled to another input of countershaft power-shift transmission. In a fourth example of the system, optionally including one or more or each of the first through third examples, the first, second, third, and fourth shafts are all arranged parallel to one another. In a fifth example of the system, optionally including one or more or each of the first through fourth examples, the first shaft is vertically above the second shaft, the second shaft is vertically above the third shaft, and the third shaft is vertically above the fourth shaft when arranged in a vehicle.

It will be appreciated that the configurations and routines disclosed herein are exemplary in nature, and that these specific examples are not to be considered in a limiting sense, because numerous variations are possible. For example, the above technology can be applied to powertrains that include different types of propulsion sources including different types of electric machines and transmissions. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system for a multi-ratio gearbox, comprising:
a first shaft coupled to one or more input speed reduction gear sets;
a second shaft coupled to a multi-range clutch, wherein the second shaft is coupled to the first shaft via a first input speed reduction gear set of the one or more input speed reduction gear sets;
a third shaft coupled to a low-speed clutch;
a fourth shaft coupled to a high-speed clutch;
a first electric motor coupled to an input side of the first shaft via a rotor shaft, wherein the rotor shaft is positioned vertically below the first shaft and the first shaft does not have any clutches positioned thereon;
a second electric motor coupled to the input side of the first shaft;
a charging pump coupled directly to a vertical top of a housing of the multi-ratio gearbox, the charging pump configured to control transmission hydraulic pressures;
a pump motor coupled to the charging pump, the pump motor coupled to the charging pump on a same side as the first electric motor and the second electric motor relative to the housing; and
a controller with instructions stored in non-transitory memory that are executed by the controller to operate the multi-ratio gearbox with each of the first electric motor and the second electric motor turning in a first forward direction with each of four gear ratios including with: (1) the multi-range clutch in a first position, the low-speed clutch engaged, and the high-speed clutch disengaged, (2) the multi-range clutch in a second position, the low-speed clutch engaged, and the high-speed clutch disengaged, (3) the multi-range clutch in the first position, the low-speed clutch disengaged, and the high-speed clutch engaged, and (4) the multi-range clutch in the second position, the low-speed clutch disengaged, and the high-speed clutch engaged,
wherein the first electric motor and the second electric motor are positioned below the vertical top of the housing.

2. The system of claim 1, wherein the first and second shafts are parallel.

3. The system of claim 1, wherein the first and third shafts are parallel.

4. The system of claim 1, wherein the first and fourth shafts are parallel.

5. The system of claim 1, wherein the second and third shafts are parallel.

6. The system of claim 1, wherein the second and fourth shafts are parallel.

7. The system of claim 1, wherein the third and fourth shafts are parallel.

8. The system of claim 1, wherein the first, second, third, and fourth shafts are parallel.

9. The system of claim 8, wherein the multi-range clutch includes a first position coupling the second shaft to the third shaft via a low gear, and a second position coupling the second shaft to the third shaft via a high gear.

10. The system of claim 9, wherein the fourth shaft is positioned lower with respect to gravity than the first, second, and third shafts.

11. The system of claim 1,
wherein the instructions further include operating the multi-ratio gearbox with the motor turning in a second reverse direction with each of the four gear ratios, wherein the multi-ratio gearbox does not reverse rotation via any of the multi-range clutch, the low-speed clutch, and the high-speed clutch.

12. The system of claim 1, wherein the charging pump is configured to be detachable from the housing.

13. The system of claim 1, wherein the first electric motor and the second electric motor are coupled to the input side of the first shaft via different gear ratios.

14. The system of claim 1, wherein the first input speed reduction gear set comprises a first gear coupled to the first shaft and a second gear coupled to the second shaft, and wherein the first and second gears are coupled to each other.

15. The system of claim 1, wherein the first input speed reduction gear set couples to the second shaft at a side of the second shaft relative to the multi-range clutch.

16. A system, comprising:

a countershaft power-shift transmission having an input, the transmission housed in a transmission housing;

a first electric traction motor coupled to the input, the first electric traction motor housed in a first motor housing, wherein a vertical top of the first motor housing is below a top of the transmission housing, wherein the countershaft power-shift transmission is a four speed transmission including a first shaft coupled to one or more input speed reduction gear sets, a second shaft coupled to a multi-range clutch, a third shaft coupled to a low- speed clutch, and a fourth shaft coupled to a high-speed clutch, and wherein the first shaft does not have any clutches positioned thereon, the second shaft is coupled to the first shaft via a first input speed reduction gear set of the one or more input speed reduction gear sets, and the first shaft is coupled to a rotor of the first electric traction motor via a second input speed reduction gear set of the one or more input speed reduction gear sets, the first input speed reduction gear set comprising two meshed gears, wherein the first shaft is vertically above both the first electric traction motor and the second shaft;

a second electric traction motor coupled to a second input of the countershaft power-shift transmission, the second electric traction motor housed in a second motor housing, wherein a vertical top of the second motor housing is below the top of the transmission housing;

a charging pump directly coupled to the vertical top of the transmission housing, the charging pump configured to control transmission hydraulic pressures; and a pump motor coupled to the charging pump, the pump motor coupled to the charging pump on a same side as the first electric traction motor and the second electric traction motor relative to the housing.

17. The system of claim 16, wherein the multi-range clutch, the low-speed clutch, and the high-speed clutch are each friction clutches.

18. The system of claim 16, wherein the first, second, third, and fourth shafts are all arranged parallel to one another, and wherein the second shaft is vertically above the third shaft, and the third shaft is vertically above the fourth shaft when arranged in a vehicle.

* * * * *